United States Patent [19]

Kuramochi et al.

[11] Patent Number: 5,162,775
[45] Date of Patent: Nov. 10, 1992

[54] VARIABLE RESISTOR UTILIZING EXTENSION TYPE CONDUCTIVE RUBBER

[76] Inventors: Hiroshi Kuramochi, 20-34-603, Kamiaokinishi 1 Chome; Yasuo Okuda; Sigeyosi Ogihara, both c/o Kabushiki Kaisha Fine Rubber Kenkyuusho, 3-21, Namiki 3 Chome, all of Kawaguchi-shi, Saitama-ken, Japan

[21] Appl. No.: 488,133

[22] Filed: Mar. 5, 1990

[51] Int. Cl.⁵ .................................. H01C 10/10
[52] U.S. Cl. ...................... 338/114; 338/209; 338/39
[58] Field of Search ............ 338/114, 209, 47, 112, 338/99, 39

[56] References Cited

U.S. PATENT DOCUMENTS

| 4,281,013 | 4/1979 | Iida | 338/114 |
| 4,503,705 | 3/1985 | Polchaninoff | 338/114 X |
| 4,596,912 | 6/1986 | Hattori | 200/302.2 |
| 4,639,711 | 1/1987 | Edholm et al. | 338/114 |
| 4,847,586 | 7/1989 | Tanaga et al. | 338/114 |
| 4,918,416 | 4/1990 | Kunikane | 338/114 |
| 5,036,306 | 7/1991 | Bergkvist | 338/114 |

Primary Examiner—Marvin M. Lateef
Attorney, Agent, or Firm—M. Reid Russell

[57] ABSTRACT

A variable resistor that utilizes, as its resistive component, an extension type conductive elastomer such as a conductive silicone rubber cross-linked and then impregnated with a silicone oil, that will experience a change in electrical resistance responsive to an extension thereof. The elastomer is interposed as a sheet between a pair of electrodes and a pushing member that is capable of movement so as to press the elastomer against the ends of electrodes, creating an extension of that elastomer between the electrodes. The magnitude of which elastomer extension corresponds to the force exerted on the pushing member, and in proportion to the change in electrical resistance of that elastomer as measured across the electrodes.

12 Claims, 7 Drawing Sheets

VARIABLE RESISTOR UTILIZING EXTENSION TYPE CONDUCTIVE RUBBER

BACKGROUND OF THE INVENTION

1. Field of the Invention

This invention relates to a variable resistor and particularly to a variable resistor that utilizes an extension type conductive elastomer, where the electrical resistance value is changed responsive to an applied pushing force.

2. Prior Art

Heretofore, pressure sensitive conductive rubber (PCR) has been most typically used in a device that changes its electrical resistance value responsive to a pushing force applied thereto.

Such conventional PCR, however, has the following shortcomings:

(a) Its resistance, when compressed, decreases so extremely sharp that it essentially can present only two discrete a considerably high resistance state (non-conductive state) and a considerably low resistance state (highly conductive state); and (b) The resistance value is not stable for the force applied.

Therefore, conventional apparatus that utilize PCR, have heretofore generally been used to provide an on-/off function in response to whether or not a compressive force is applied thereto, rather than an analog-like type function as is reliably performed by the present invention.

Japanese Patent Publication No. Sho 60-33138, discloses a Japanese PCR that can provide an analog-like function. The PCR of this publication, however, apparently exhibits a lag or hysteresis between its electrical resistance value and the compressive force applied thereto, when such force is quickly increased or decreased. This lag of change in resistance is caused by a difference in the contact resistances of the rubber and electrodes relative to the change in compressive force. Accordingly, the apparent electrical resistance of the rubber for the same magnitude of the force will not necessarily be the same, as will be discussed below.

A U.S. patent application of one of the present inventors, entitled "Extension Type Conductive Rubber and Process for Making and Method for Using Same", filed contemporaneously herewith describes an arrangement of the PCR for use in a variable resistor or sensor.

To form such PCR variable resistor, a sheet of the PCR is sandwiched between a pair of opposing electrodes. Which electrodes are arranged such that when a force is applied to compress the rubber, the electrical resistance across the electrodes will be decreased in response to the magnitude of such force. In such a device, the electrical resistance across the electrodes involves contact resistances between the electrode surfaces and the rubber as well as the electrical resistance of the rubber itself. Accordingly, as a compressive force is increased, there will occur a slip between surfaces of the electrodes and those of the rubber, bringing the electrodes into closer contact with that rubber. This action decreases the contact resistances between the rubber and electrodes. Such slippage will also occur as the compressive force is decreased diminishing the contact between the electrode surface and the rubber, thereby increasing the contact resistance therebetween. Additionally, however, when the compressive force on the rubber surface is increased, a mechanical frictional resistance will exist between the electrodes and rubber that delays the slip that would result in a decrease in the contact resistance. This delays the decrease in the electrical resistance across the electrodes as occurs due to slippage between the surfaces. Similarly, when the compressive force is decreased, the frictional resistances will delay the slip, and the resultant increase in contact resistances. This effect delays an increase of the electrical resistance across the electrodes. The relation between the application and removal of compressive force and the electrical resistance across the electrodes thereby presents a hysteresis, and accordingly, the apparent electrical resistance of the rubber for the same magnitude of the force will not necessarily be consistent. This inconsistency is solved by the present invention.

SUMMARY OF THE INVENTION

Therefore, it is a primary object of the present invention to provide a variable resistor that will consistently change its electrical resistance value in response to a certain magnitude of a pushing force applied thereto.

Another object of the present invention is to provide a variable resistor wherein the change of the resistance value for a change in the magnitude of the applied pushing force is not extremely sharp but moderate and almost linear.

Another object of the present invention is to provide a variable resistor wherein the relationship between the resistance value and the magnitude of the force applied thereto is stable.

Still another object of the present invention is to provide a variable resistor wherein a hysteresis in the relation between its resistance value and the force applied thereto will be quite small.

A further object of the present invention is to provide a variable resistor that is simple in structure.

Still further object of the present invention is to provide a variable resistor that is easy to assemble.

Yet further object of the present invention is to provide a variable resistor that is inexpensive to manufacture.

One of the present inventors has developed an extension type conductive rubber as disclosed in a U.S. patent application entitled "Extension Type Conductive Rubber and Process of Making and Method for Using Same" of the same inventor. Which conductive rubber is manufactured by impregnating a cross-linked conductive silicone rubber that contains suspended carbon particles, with a silicone oil that has a compatibility with the conductive silicone rubber. This extension type conductive rubber, when extended, provides a electrical resistance in response and inversely proportional to the force of that extension as is subjected to. The change in electrical resistance value for a certain extension is not extremely sharp but moderate and almost linear and the relation therebetween is predictable.

In accordance with the above described objects, the present invention is in a variable resistor that utilizes an extension type conductive elastomer, such as the above-mentioned extension type conductive rubber. Which elastomer, when extended, changes its electrical resistance value in response to the magnitude of extension that directly relates to the force applied thereon. The variable resistor of the present invention includes a pair of electrodes that are individually supported to be appropriately spaced apart from one another. A movable pushing member is supported so as to be movable toward and away from the electrodes. The movable pushing member may be, for example, a substantially rigid body, or can be a pliable member with an elastic body, as required. In either arrangement, the extension type conductive elastomer is interposed between the electrodes to be acted upon by the movable pushing member such that it will be pressed against the elastomer. The elastomer thereby experiences an extension at the portion thereof located between the electrodes by the movable pushing member.

In the variable resistor of the present invention, when the movable pushing member is pushed downwardly, toward the elastomer, the portions of the elastomer that individually are in contact with the electrodes will be pressed against these electrodes. The elastomer and electrodes are electrically connected so as to exhibit a very small contact resistance therebetween. At the same time, that portion of the elastomer that extends between the electrodes will be extended thereby causing the electrical resistance of the elastomer as measured between the electrodes to change. Since the magnitude of the extension corresponds to the force exerted on the movable pushing member, the electrical resistance value of the elastomer between the electrodes and across the electrodes will directly change in response to the force exerted on the pushing member, which change is reproducible.

The contact resistances between the electrodes and the elastomer presents a hysteresis, as is the case with the pressure sensitive conductive rubber (PCR) as set out in the above-mentioned Japanese Patent Publication No. ShO 60-33138. In the present invention, however, a hysteresis based on the contact resistances will be quite small as compared with the total electrical resistance measured across the electrodes. Accordingly, since the resistance of each contact accounts for only a small percentage of the total electrical resistance as measured across the electrodes, the electrical resistance exhibited by the elastomer between the electrodes will be so much greater than the contact resistances that the contact resistances can be essentially ignored.

According to one aspect of the present invention, the variable resistor is constructed such that, prior to the movable pushing member being depressed toward the electrodes, the rubber will already be sandwiched tightly against the electrode surfaces. Accordingly, as the contact resistances between the electrodes and the elastomer are essentially unchanged over a distance of travel of the movable pushing member, the hysteresis of the electrical resistance across the electrodes will remain constant. So arranged, a change in resistance value will therefore be attributable to stretching of the elastomer.

The variable resistor of the present invention is inexpensive to produce and is easy to assemble with the elastomer sandwiched between the electrodes, with the movable pushing member mounted to move thereagainst, the arrangement thereafter requiring mechanical connection only.

BRIEF DESCRIPTION OF THE DRAWINGS

These and other objects and features of the present invention will become more apparent from the following description in which the invention is described in detail in conjunction with the accompanying drawings.

DETAILED DESCRIPTION OF THE EMBODIMENT

Figure 1:
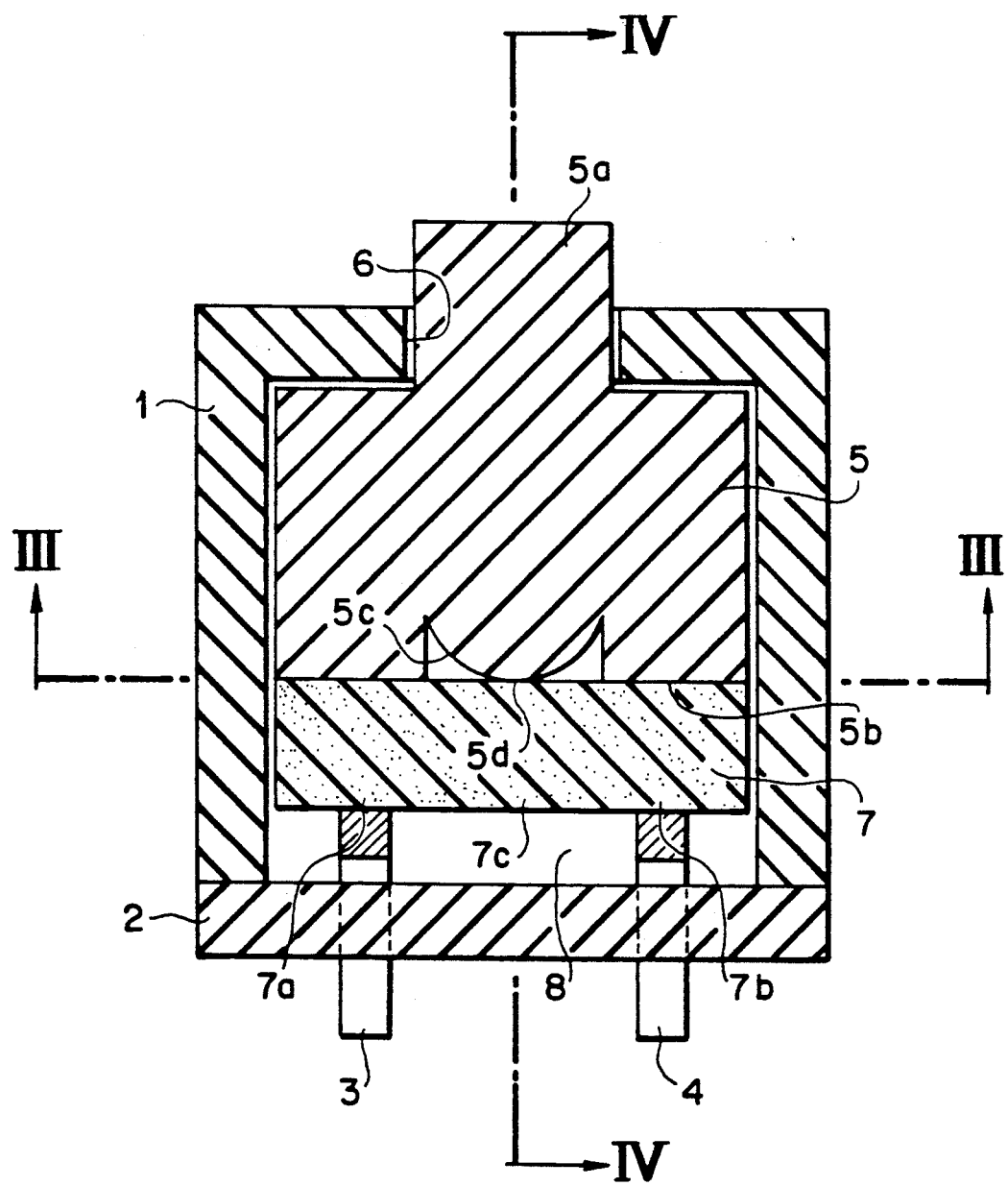
FIG. 1 is a side elevation sectional view of a first embodiment of a variable resistor of the present invention showing its movable pushing member positioned above a relaxed section of a conductive rubber.

FIGS. 1 to 5 show a first embodiment of a variable resistor of the present invention. In this embodiment, a case 1, that is preferably constructed from a electrical insulating material, is formed into a box shape that is open across a bottom face. A base plate 2 is mounted over the open bottom face of case 1, so as to close the case. Which base plate 2 is also made of an electric insulating material and includes a pair of outwardly extending channel shaped electrodes 3 and 4 that are fixed through the case base plate so as to be parallel to one another, their longitudinal sides extending perpendicularly through the base plate from inside to outside, with their intermediate lateral sides parallel to that base plate. A movable essentially rigid pushing member 5, hereinafter referred to as pushing member, is shown contained to be moveable up and down within the case 1. The pushing member 5 is preferably manufactured from an electric insulating material and is fitted into the case 1. The pushing member includes a cylindrical end portion 5a that projects outwardly from an opening or hole 6 through the case 1 top. The pushing member 5 includes a flat face portion 5b that is the opposite face to the cylindrical end portion and is substantially parallel to the base plate 2. Which flat face portion 5b includes a half spherical dimple 5c formed centrally within the flat base portion 5b. The bottom centered of which dimple 5c, designated at 5d, is approximately planer to the flat face portion 5b.

Figure 6:
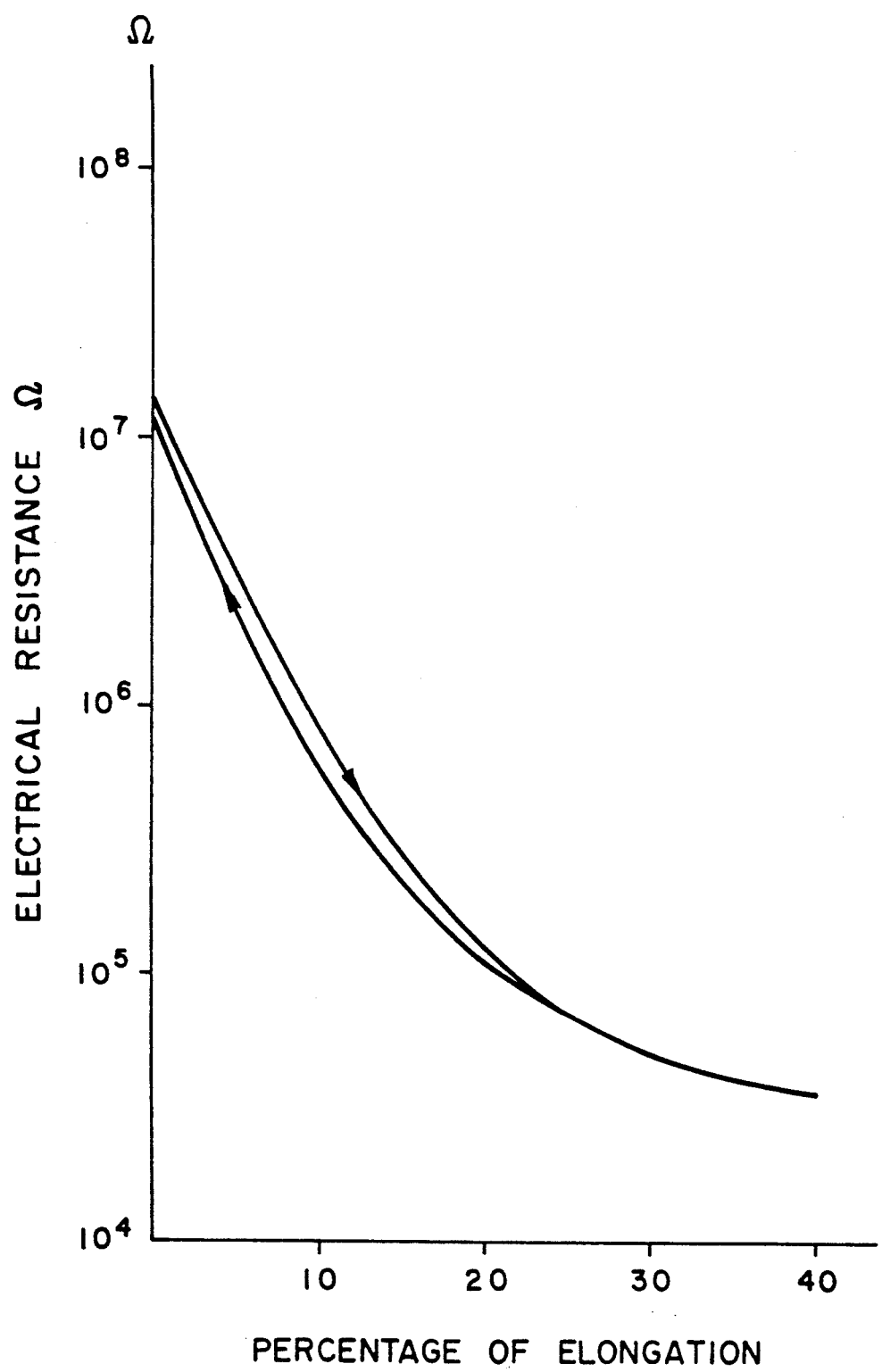
FIG. 6 is a graph of a characteristic curve illustrating the relation between the percentage of elongation and the electrical resistance of an extension type conductive rubber a utilized in the embodiment of FIGS. 1 to 5.

Interposed between the base plate 2 and the pushing member 5 is a sheet of an extension type conductive rubber 7, hereinafter referred to as rubber. Rubber 7 is such that, when it is placed in tension, its electrical resistance value will change directly in response to the magnitude force applied. FIG. 6 shows a characteristic curve of the relation between the percentage of rubber elongation and the electrical resistance measured across electrodes through the extension type conductive rubber of the same material as the rubber 7. Which characteristic curve was obtained by testing a test piece of the extension type conductive rubber that is 50.0 mm in length, 5.0 mm in width and 0.3 mm in thickness. As shown in this graph, the electrical resistance value of the rubber 7 is considerably high when the rubber is not under tension, and lowers as the rubber is stretched. The graph shows that the change in electrical resistance for a change in elongation is not extremely sharp but moderate and almost linear.

An extension type conductive rubber that has characteristics as set out in FIG. 6, for example, can be obtained by impregnating a cross-linked conductive silicone rubber that contains suspended carbon particles, with a silicone oil that has a compatibility with the selected conductive silicone rubber. Such rubber is disclosed in the aforementioned U.S. patent application of one of the present inventors that is preferred for use in this invention.

Without an external force applied to the pushing member 5, a space 8 will exist between the base plate 2 and the undersurface of the rubber 7, between the ends of electrodes 3 and 4.

Figure 2:
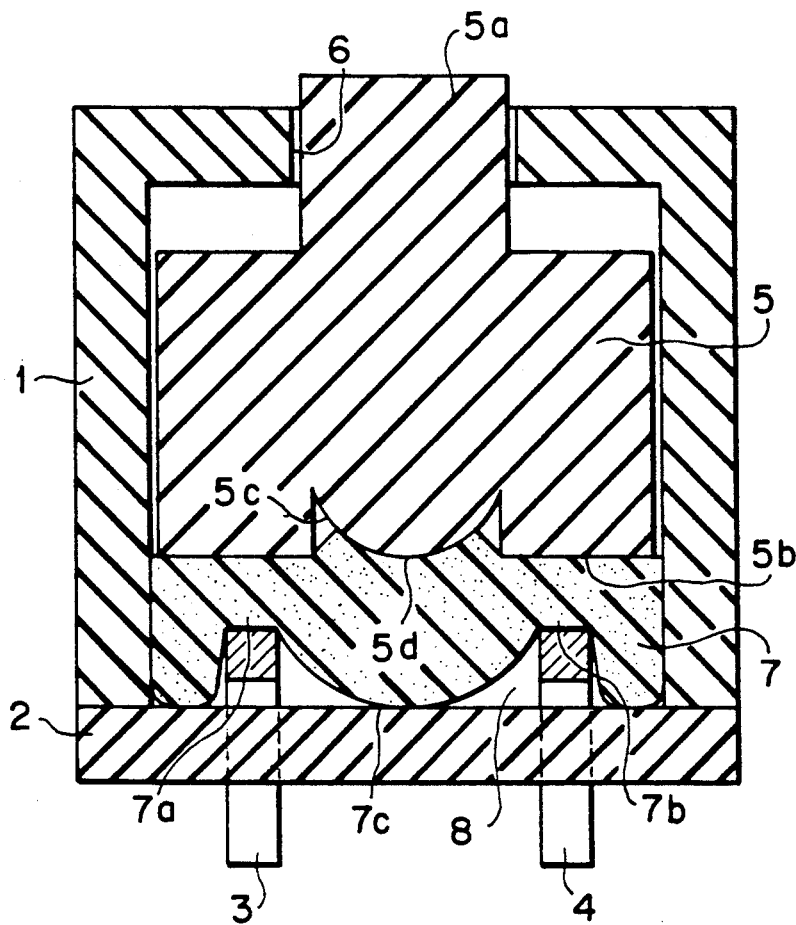
FIG. 2 is a side elevation sectional view that is similar to FIG. 1, but shows the movable pushing member as having moved into the conductive rubber.
Figure 3:
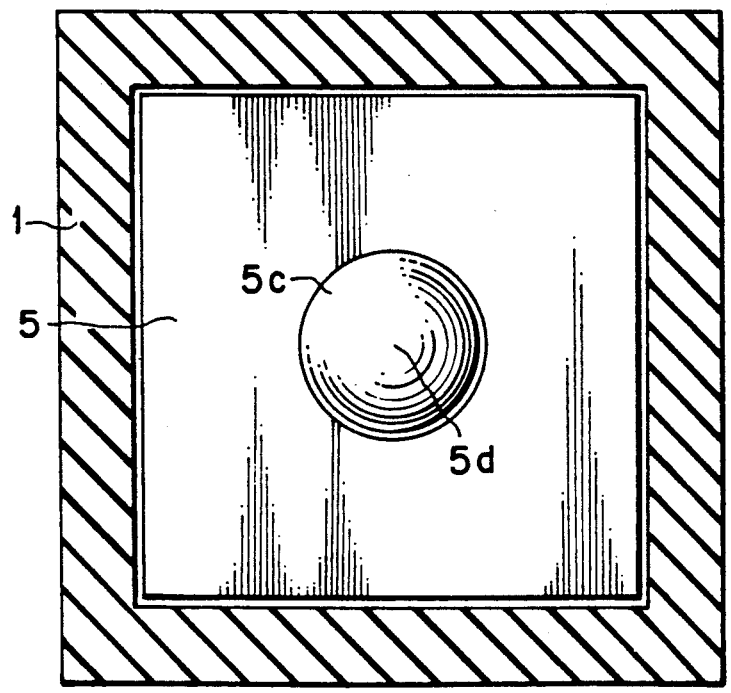
FIG. 3 is a sectional view taken along the line 3—3 of FIG. 1.
Figure 4:
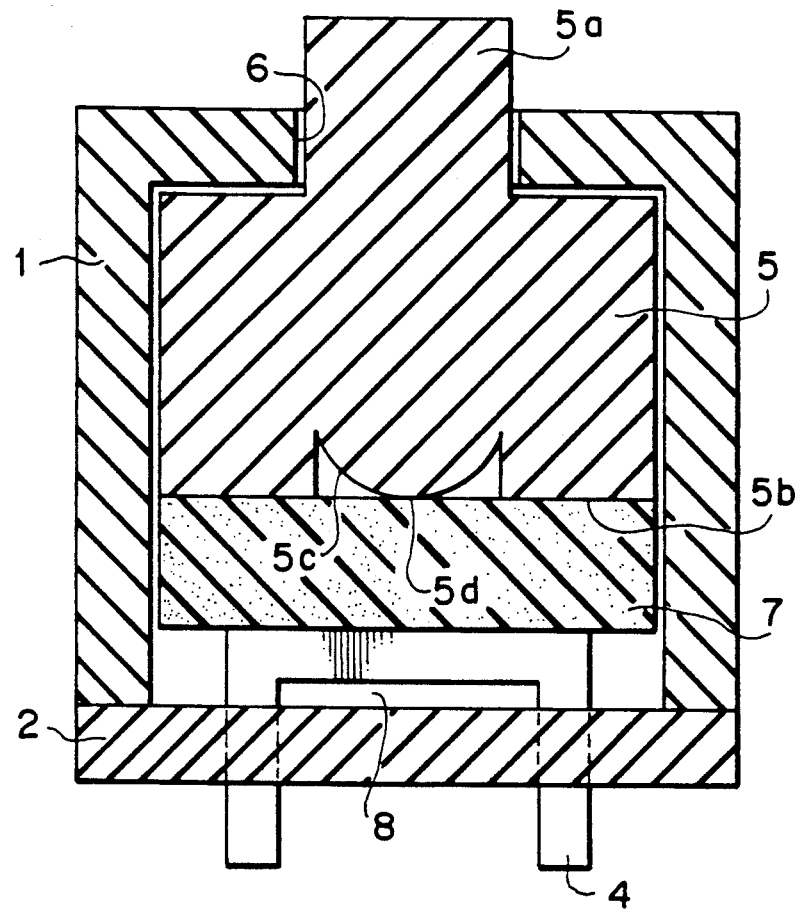
FIG. 4 is a front elevation sectional view taken along the line 4—4 of FIG. 1.
Figure 5:
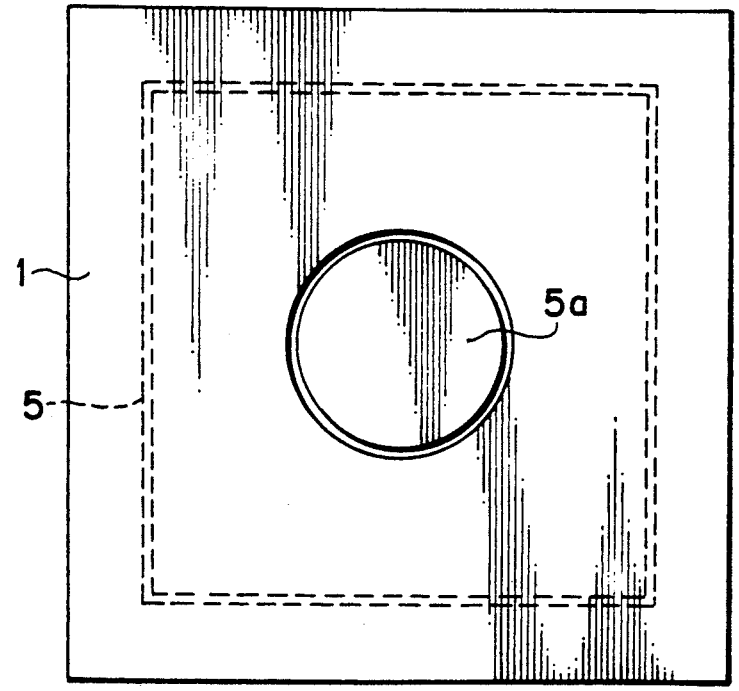
FIG. 5 is a top plan view of the view of FIG. 4.

Operation of this embodiment is substantially as follows:

As shown in FIG. 1, before a force is applied to the pushing member 5, the electrical resistance of the rubber 7 is at its highest value as is the electrical resistance across the electrodes 3 and 4. When the cylindrical end portion 5a of the pushing member 5 that extends outwardly from the top of case 1 is depressed, the flat face portion 5b of pushing member is moved toward the electrodes 3 and 4 as shown in FIG. 2. Thereby segments 7a and 7b, that extend from the intermediate 7c of the rubber 7 and are for contacting the electrodes 3 and 4, respectively, are pressed tightly against the electrodes. This coupling forms an electrical connection that has a very small contact resistance. Further, the section 7c of the rubber 7, that extends between the electrodes 3 and 4, is engaged by the dimple portion 5c of the pushing member 5, that rubber deforming into space 8 that is between the rubber section 7c and base plate 2, experiencing an extension. This extension causes the electrical resistance of the rubber 7, as measured between electrodes 3 and 4, to decrease. The magnitude of the extension is proportional to the amount of force exerted on the pushing member 5, which force also relates to the electrical resistance as measured between the electrodes 3 and 4.

As set out above, the contact resistances between the rubber 7 and the electrodes 3 and 4 present a hysteresis. That hysteresis however is quite small when the entire electrical resistance across the electrodes 3 and 4 is considered.

The variable resistor of FIGS. 1 through 5 may be constructed such that, prior to depression of the pushing member 5, the rubber will be somewhat compressed against the electrodes. For example, the thickness of the rubber 7 positioned within the case 1 can be such that it is tightly sandwiched between pushing member 5 and the electrodes 3 and 4. So arranged, the hysteresis of the electrical resistance across the electrodes 3 and 4 will be further decreased.

With the release of a pushing force exerted on the pushing member 5, the variable resistor will return to its initial state, as shown in FIG. 1. This return is due to a spring action provided by the elasticity of the rubber 7.

As the rubber 7 is firmly held between the pushing member 5 and the electrodes 3 and 4, during deformation the rubber 7 will not slip from therebetween as the dimple 5c of the pushing member, that is pushed into the center of the rubber between the electrodes, holds the rubber in place.

The entire pushing member 5 is preferably fabricated from an electric insulating material. It should, however, be understood that a part of the pushing member 5 can be formed of a conductive material, as required, so long as that conductor portion is insulated from and would not negatively influence the change of the electrical resistance value across the electrodes.

Figure 7:
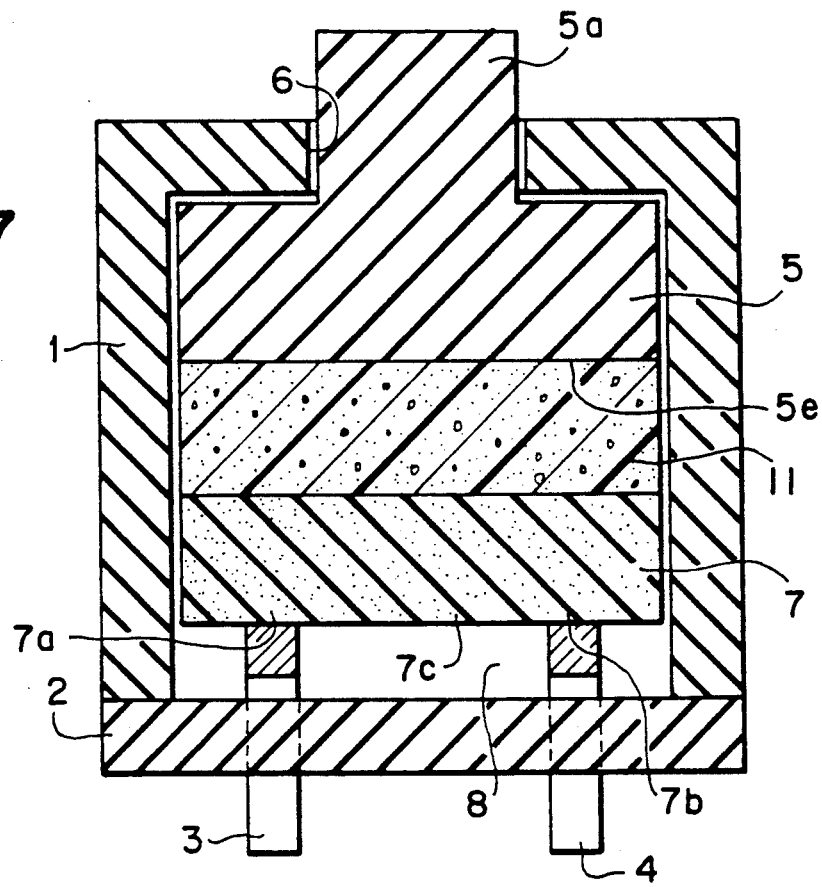
FIG. 7 is a side elevation sectional view of a second embodiment of a variable resistor that includes a movable pushing member positioned above relaxed section of a conductive rubber.
Figure 8:
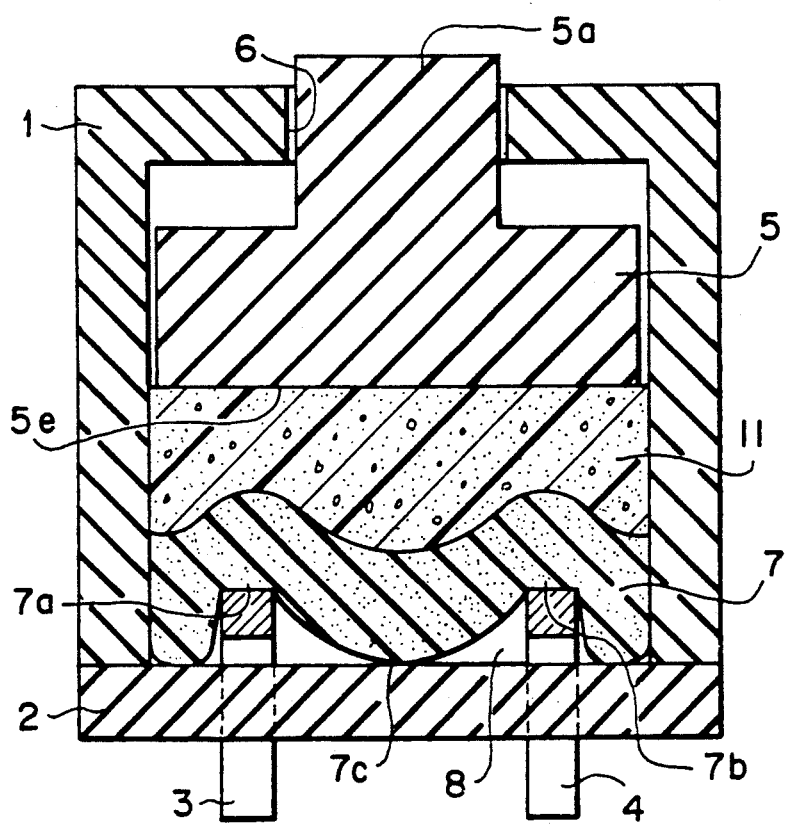
FIG. 8 is side elevation sectional view that is similar to that of FIG. 7, but shows the movable pushing member as having moved into a conductive rubber.

FIGS. 7 and 8 show a second embodiment of the variable resistor of the present invention. This embodiment is like the embodiment of FIGS. 1 through 5, except that it additionally includes an intermediate member 11 that is arranged beneath a pushing member 5, which pushing member 5 in this embodiment does not include dimple 5c formed on its undersurface 5e, for engaging the top surface of rubber 7. The intermediate member 11 is preferably formed of an electrically insulating material that has pliability and elasticity, as for example, a sponge or polyurethane foam.

Operation of this embodiment is substantially as follows:

As shown in FIG. 7, without an external force applied to the pushing member 5, the electrical resistance of the rubber 7 between the electrodes 3 and 4 will be at its highest level, providing a maximum electrical resistance as measured across the electrodes. When the top end 5a of the pushing member 5 that extends beyond the case 1 is depressed into the case the pushing member 5 is moved toward the electrodes 3 and 4, as shown in FIG. 8. In that operation, the contacting segments 7a and 7b of the rubber 7 that engage the electrodes 3 and 4, respectively, will be pressed against the electrodes. Simultaneously, the portions of the intermediate member 11 above the electrodes will be pressed into the area between the electrodes, urging the section 7c of the rubber 7 between the electrodes, deforming it into the area or space 8. Thereby, the rubber 7 is extended, decreasing its electrical resistance as measured between the electrodes, and the total electrical resistance measured as across the electrodes 3 and 4 is also decreased.

When the force exerted on the pushing member 5 is discontinued, the variable resistor will return to its initial state, as shown in FIG. 7, responsive to the elasticity of both the rubber 7 and the intermediate member 11.

Figure 9:
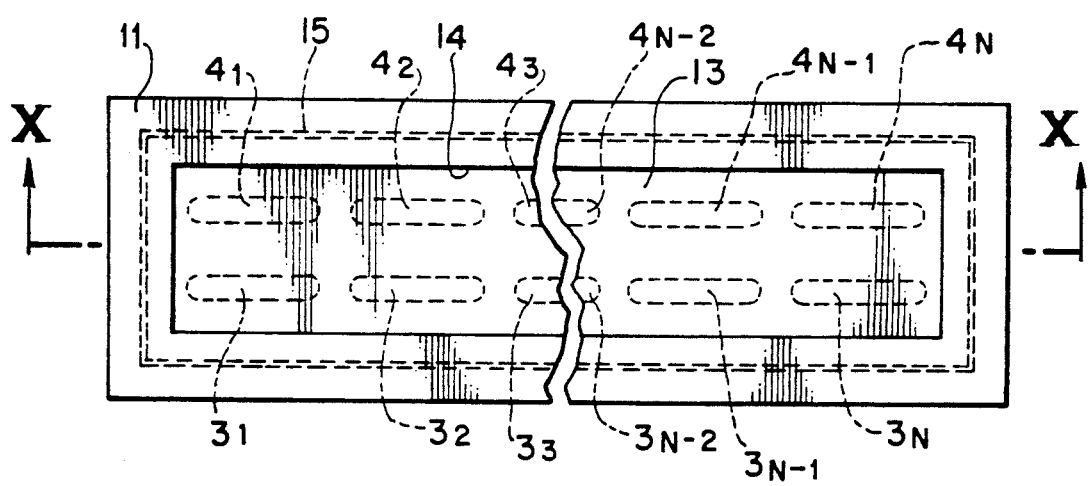
FIG. 9 is a top plan view of a third embodiment of a variable resistor.
Figure 10:
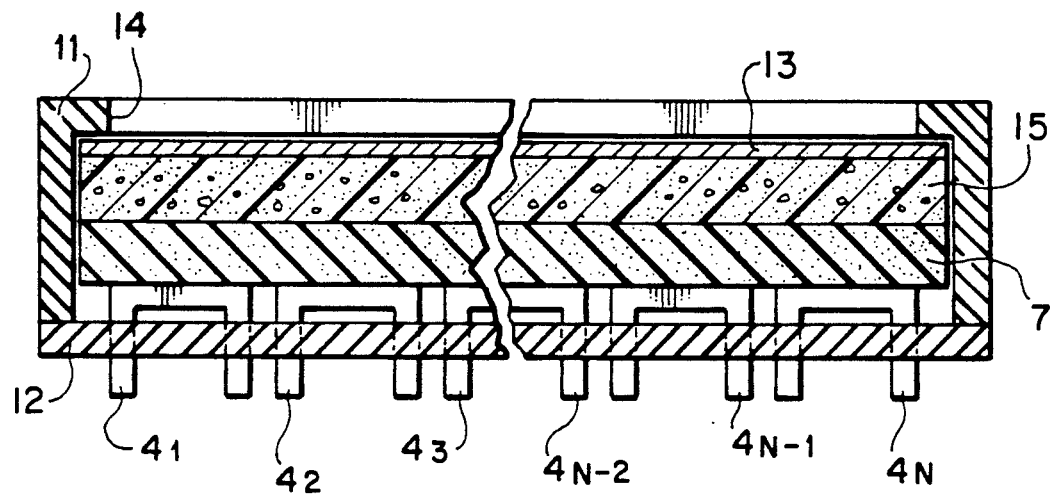
FIG. 10 is a sectional view taken along the line 10—10 of FIG. 9.

FIGS. 9 and 10 show a third embodiment of a variable resistor of the present invention. In this embodiment, a case 11 that is made of an electric insulating material is formed into a long rectangular box shape whereto a base plate 12, that is likewise manufactured of an electric insulating material, is mounted. The base plate extends across an open bottom face thereof, closing the case into a long rectangular box shape. A plurality of pairs of channel shaped electrodes $3_1, 3_2, ..., 3_N$ and $4_1, 4_2, ..., 4_N$, respectively, are fixed in the base plate 12, with both their sides extending perpendicular therethrough from inside to the outside of the base plate. That individual electrodes in each pair are parallel to one another.

Within the case 11, a long rectangular sheet of extension type conductive rubber 7, that is like that shown in FIGS. 1 through 5, is laid on to cover the electrodes. An insulative layer 15 is placed over the rubber 7, within case 1, which insulative layer is a long rectangular sheet having substantially the same length and width as that of the sheet of rubber 7 of this embodiment. The insulation layer is preferably made of an electrically insulative material that has pliability and elasticity. For example, a sponge or polyurethane foam layer can be utilized as the insulative layer. A cover 13 is positioned over the insulative layer 15. Cover 13 is also a long rectangular sheet that has substantially the same length and width dimensions as do the rubber 7 and the insulative layer 15. Which cover 13 is made of a pliable and elastic material such as a soft plastic. The greater part of the cover 13 will be exposed to without the casings through a rectangular opening 14 that is formed in the top face of the case 11. When no external force is exerted on cover 13 to depress the insulation layer 15, a space that is similar to the space 8 of the aforesaid embodiments of FIGS. 1 through 5, 7 and 8, is opened between the base plate 2 and the portion of the rubber 7 that extends between the columns of electrodes $3_1$, $3_2$, ..., $3_N$ and $4_1$, $4_2$, ..., $4_N$.

Operation of this embodiment is substantially as follows:

When any part of the insulative layer 15 is depressed down by application of a force through the cover 13, as through an operator's finger, this force, in turn, is exerted against an opposite face portion of the rubber 7. The rubber 7 is thereby urged against the corresponding pair of electrodes, and the area of the rubber between the same electrodes is extended. Thereby, the electrical resistance, as measured across this pair of electrodes, is decreased responsive to the magnitude of the compressive force exerted by the operator's finger and resulting extension of rubber 7.

Where the cover 13, in this embodiment, is provided over the insulative layer 15, it should be understood that it is not essential to the present invention and a force could be applied directly to that insulative layer. Also it should be understood that, the electrodes $3_1$, $3_2$, ..., $3_N$ or $4_1$, $4_2$, ..., $4_N$ can be formed as individual or as common electrodes.

Figure 11:
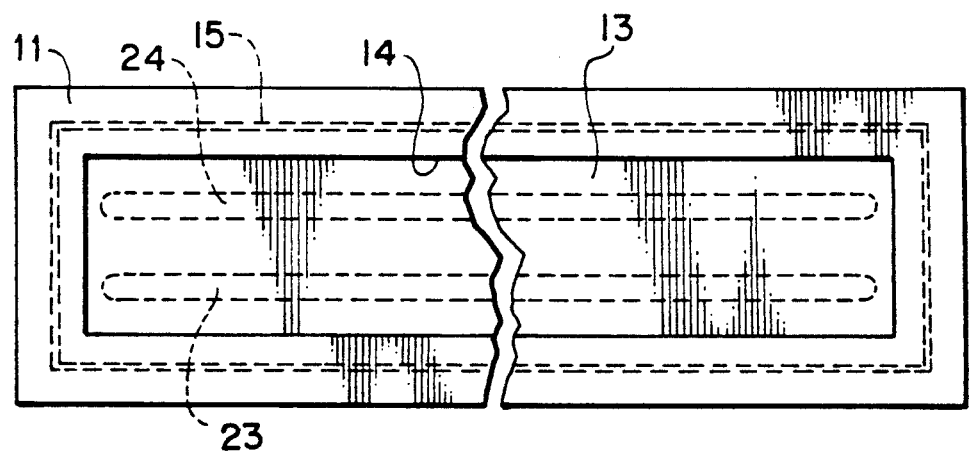
FIG. 11 is a plan view of a fourth embodiment of a variable resistor of the present invention.

FIG. 11, shows a fourth embodiment of a variable resistor of the present invention. In this embodiment, unlike the embodiment of FIGS. 9 and 10, the variable resistor employs a pair of electrodes 23 and 24 that extend the entire length of and beneath a section of rubber 7, that is preferably the same rubber as set out and described hereinabove with respect to FIGS. 1 through 5 and 7 through 10. The casing, insulative layer and cover are like those shown in the embodiment of FIGS. 9 and 10 and accordingly have been numbered. So arranged, whichever part of the long insulative layer 15 is pushed down by operation of a operator's finger, the electrical resistance as measured across the electrodes 23 and 24 will decrease in response to the magnitude of that applied force.

In the above-mentioned embodiments, the compressive members and insulative layer are pushed directly or are depressed through the cover by an operator's finger. Alternatively, a lever or the like, can be employed to provide an application of force onto rubber 7.

While preferred embodiments of the present invention in a variable resistor have been shown and described herein, it should be apparent that the present disclosure is made by way of example only and that variations thereto are possible within the scope of the disclosure without departing from the subject matter coming within the scope of the following claims and a reasonable equivalency thereof, which claims we regard as our invention.

We claim:

1. A variable resistor comprising, support means that are arranged as a container; a pair of electrodes, each having an end portion and supported by said support means to be appropriately spaced apart from one another and extend from outside to inside said support means; a pushing member means that is maintained in said support means to be opposite to and movable towards and away from said electrodes; and a section of an extension type conductive elastomer that, when extended alters its electrical resistance value in response to the magnitude of the applied force that causes the extension, said section of extension type conductive elastomer being interposed between said electrodes and said pushing member means such that, when said pushing member means is pushed toward said electrodes, said extension type conductive elastomer will be pressed against said electrodes and at the same time will experience an extension into an area between said electrodes, the spacing between the electrode ends and the points of contact of said extension type conductive elastomer with said electrode ends remaining substantially the same while said extension type conductive elastomer is pressed against said electrodes.

2. A variable resistor as set forth in claim 1, wherein the extension type conductive elastomer is an extension type conductive rubber that, when extended, will decrease in electrical resistance value proportional to the force of extension exerted thereon.

3. A variable resistor as set forth in claim 1, wherein the section of extension type conductive elastomer is a sheet that is configured to fit across the support means.

4. A variable resistor as set forth in claim 3, wherein the electrodes each have a channel shape, the ends of the outstanding legs thereof to be opposite to surface of the extension type conductive elastomer.

5. A variable resistor as set forth in claim 3, wherein the pushing member is arranged in the support means to be biased outwardly from the extension type conductive elastomer a face of which, when in a relaxed state, just engages the ends of the electrodes; and when a force is applied to said pushing member so as to compress the extension type conductive elastomer against said electrodes, that extension type conductive elastomer will extend into the area between said electrodes.

6. A variable resistor as set forth in claim 5, wherein the pushing member is substantially a rigid body.

7. A variable resistor as set forth in claim 6, wherein the pushing member includes a flat face that rests against one face of the extension type conductive elastomer and is opposite to the ends of the electrodes that engage the opposite extension type conductive elastomer face, which flat face includes a dimple centrally inset therein, said dimple to urge the extension type conductive elastomer to sag into the area between said electrodes, providing an extension of said extension type conductive elastomer when said pushing member is urged toward said electrode ends.

8. A variable resistor as set forth in claim 7, wherein the dimple formed in the pushing member is spherical, its highest point on line with the surface of the said pushing member.

9. A variable resistor as set forth in claim 6, further including an intermediate layer that is sandwiched between the pushing member and the extension type conductive elastomer, which said intermediate layer is pliable and elastic.

10. A variable resistor as set forth in claim 5, wherein the pushing member is pliable and elastic.

11. A variable resistor as set forth in claim 10, further including plurality of pairs of electrodes.

12. A variable resistor as set forth in claim 1, wherein the extension type conductive elastomer is interposed between the electrodes and the pushing member such that in a relaxed state it is sandwiched thereagainst under compression.

* * * * *